United States Patent [19]

Smith

[11] 4,252,672

[45] Feb. 24, 1981

[54] PREPARATION OF COLLOIDAL IRON DISPERSIONS BY THE POLYMER-CATALYZED DECOMPOSITION OF IRON CARBONYL AND IRON ORGANOCARBONYL COMPOUNDS

[75] Inventor: Thomas W. Smith, Penfield, N.Y.

[73] Assignee: Xerox Corporation, Stamford, Conn.

[21] Appl. No.: 100,305

[22] Filed: Dec. 4, 1979

[51] Int. Cl.$^3$ .......................... B01J 31/02; C08K 3/08
[52] U.S. Cl. .................................. 252/430; 260/42.22; 430/286; 430/945; 568/451; 568/454; 568/455
[58] Field of Search ................ 252/430; 260/604 HF, 260/42.22; 430/945, 286

[56] References Cited

U.S. PATENT DOCUMENTS

| | | | |
|---|---|---|---|
| 3,228,881 | 1/1966 | Thomas | 260/39 M |
| 3,281,344 | 10/1966 | Thomas | 260/42.22 |
| 3,824,221 | 7/1974 | Ragg | 260/604 HF |
| 3,998,864 | 12/1976 | Trevillyan | 260/604 HF |
| 3,998,887 | 12/1976 | Allen | 260/604 HF |

*Primary Examiner*—John F. Niebling
*Attorney, Agent, or Firm*—H. M. Brownrout; E. O. Palazzo; P. P. Eichler

[57] ABSTRACT

There is disclosed a method for the preparation of a homogeneous, physically stable colloidal elemental iron dispersion of colloidal iron particles having a size in the range of from about 10 Angstrom units to about 200 Angstrom units. The method comprises preparing a solution of a passive polymer in an inert solvent, and incrementally adding thereto an iron precursor, at a temperature at which the iron precursor will lose at least one ligand and become bound to the passive polymer and thermally decompose to produce elemental iron particles, the process being carried out in an inert atmosphere. Such dispersions may be used per se as catalysts, or may be used for the preparation of supported colloidal iron catalysts. The dispersions may also be used for the preparation of ablative optical recording media, and for the preparation of magnetic xerographic developer materials.

39 Claims, No Drawings

PREPARATION OF COLLOIDAL IRON DISPERSIONS BY THE POLYMER-CATALYZED DECOMPOSITION OF IRON CARBONYL AND IRON ORGANOCARBONYL COMPOUNDS

The present invention relates to a novel method for the preparation of homogeneous colloidal elemental iron dispersions, with the use of a passive polymer in dilute solution in any of a large variety of suitable inert solvents, and with the use of any of a large variety of suitable iron precursors. The invention also relates to the homogeneous colloidal elemental iron dispersions, to their use as catalysts and for the preparation of supported iron catalysts, to their use as materials useful for the preparation of ablative optical recording media, and to their use in the preparation of magnetic xerographic developer materials.

In general, the preparation of the homogeneous colloidal elemental iron dispersions of the invention involves the thermal decomposition of a suitable iron precursor in a relatively dilute solution of a passive polymer in an inert solvent for the iron precursor and the passive polymer, the reaction being carried out in an inert atmosphere, with the thermal decomposition of the iron precursor occurring primarily with the precursor bound to the passive polymer. The term "passive polymer" as used herein and defined more particularly hereinafter refers generally to polymer molecules substantially each of which contains at least one reactive binding site for the iron precursor, at which sites the iron precursor molecules react to produce polymer-bound iron precursor. Such polymers are to be distinguished from "active polymers" in that systems for the preparation of colloidal iron dispersions employing a passive polymer in solution require sufficient heat or other stimulus to remove at least one ligand from the iron precursor molecule before the iron precursor can become bound to the polymer; that is, the iron precursor molecules cannot react directly and spontaneously with the binding sites of the passive polymer, but only after loss of one or more ligands. Preferably, the appropriate amount of the desired passive polymer is dissolved in the appropriate amount of the desired inert solvent, and the solution is heated to the appropriate reaction temperature at which thermal decomposition of the polymer-bound iron precursor will occur, whereupon the appropriate amount of the desired iron precursor is added in appropriate increments and binds to the passive polymer. This incremental addition is continued until the appropriate total amount of iron precursor has been added and permitted to thermally decompose.

Depending upon the choice of inert solvent, passive polymer, iron precursor, and the preparative conditions, homogeneous colloidal iron dispersions of the invention may contain colloidal iron particles having an overall size range of from about 10 Angstrom units to about 200 Angstrom units. Usually, however, the materials and conditions are selected such that any given dispersion produced will inherently have a relatively narrow particle size range within the overall range of from about 10 Angstrom units to about 200 Angstrom units, the materials and conditions being selected to produce a particle size range suitable for the intended end use of the dispersion. As practical upper limit, the particle size is typically about 200 Angstrom units, since colloidal iron dispersions according to the invention having such a maximum particle size are typicaly very physically stable; that is, they do not settle in periods of years. If the colloidal iron particle size substantially exceeds about 200 Angstrom units, the dispersions tend to lack physical stability and may flocculate. The minimum particle size observed is about 10 Angstrom units. The maximum particle size observed is about 200 Angstrom units. Dispersions having a maximum particle size of about 150 Angstrom units have the best physical stability. The colloidal iron dispersions according to the invention are also very chemically stable if kept in an inert environment such as argon. Extensive oxidation of the iron particles will occur readily in the presence of oxygen. Preferably, under some circumstances, it is desired to regulate the conditions such that the maximum particle size is no greater than about 120 Angstrom units, colloidal iron dispersion having such a maximum particle size typically being superparamagnetic. Dispersions having a maximum particle size between about 120 Angstrom units and about 200 Angstrom units show a weak time-dependent ferromagnetism which leads to magnetic chaining of the particles, which can, but does not necessarily, lead to agglomeration and precipitation of the particles.

Considering the possible catalytic utilities of the colloidal iron dispersions of the instant invention, it is known that the catalytic activity of colloidal iron particles is usually inversely proportional to the size of the particles. Accordingly, the most efficient particle size for catalytic use may be in the minimum size range. There are, however, two features of the use of dispersions of this invention as catalysts which outweigh simple considerations of particle size in the efficiency of the catalyst. This invention provides a method for the preparation of independent unsupported colloidal particles of controlled narrow particle size distribution. These dispersions can subsequently be immobilized in an appropriate solid phase to yield a solid catalyst which contains a high loading of colloidal catalytic particles. In processes where the colloidal particles are generated in situ, i.e., on the support, by reduction of adsorbed ions, high percentages of catalyst loading cannot be achieved while maintaining a small particle size and a narrow particle size distribution. The most important feature of the catalytic activity of the dispersions of this invention is the role of the polymer bound to the particles' surfaces. In the presence of reducing gases, the functional sites on the polymer can react with the iron atoms to generate the active catalytic species in a liquidous layer surrounding the particle. The colloidal iron dispersions may not only be used as catalysts per se; they may also be supported in a suitable solid support. Various reactions which may be catalyzed by the colloidal iron of the instant invention include hydroformylation reactions, oxidative coupling, and hydrogenation of alkenes.

For the preparation of ablative optical recording media, it is preferred generally to maximize the particle size up to about 120 Angstrom units, so the superparamagnetic properties are present, and it is also desirable to maximize the ratio of colloidal iron to the active polymer, which may be accomplished by minimizing the amount of polymer and maximizing the amount of iron precursor during the incremental addition of the iron precursor. The basic reason for this is to maximize the light absorptivity of the oxidized iron films. Ablative optical recording media which may be prepared from colloidal iron dispersions according to the instant invention are described in copending U.S. patent application Ser. No. 054,204, filed July 2, 1979, entitled "Optical Disk", which application is assigned to the assignee of the instant application.

As already mentioned, the superparamagnetic iron dispersions of the present invention, that is, those dispersions having a particle size of about 120 Angstrom units or less may also be utilized in the preparation of superparamagnetic xerographic developer materials. Indeed, for utility in the preparation of ferromagnetic xerographic developer materials, for example, it has been found quite suitable to utilize colloidal iron dispersions according to the invention having particle sizes up to about 200 Angstrom units.

Considering the method of producing homogeneous colloidal iron dispersions according to the invention in greater detail, a suitable solvent is required which will dissolve the passive polymer and the iron precursor, and the iron precursor becomes bound to the reactive sites of the passive polymer after the loss of at least one ligand from the iron precursor. The bound iron precursor tends to decompose to iron at a rate which is greatly in excess of the rate of any decomposition of unbound iron precursor molecules.

Considering suitable passive polymers in greater detail, it has already been indicated that a suitable passive polymer is any polymer which contains one or more reactive binding sites which will react with the iron precursor molecules which have lost at least one ligand to yield polymer-bound iron precursor molecules. It is highly preferred that this binding occur much more rapidly than any substantial decomposition to metallic iron of unbound iron precursor molecules remaining dissolved in the solvent. It is also highly preferred that the polymer-bound iron precursor decomposes at a much more rapid rate than the unbound iron precursor. This insures that the iron particles will be generated primarily in the domain of the polymer molecules.

The ratio of passive polymer to the amount of solvent employed is important. The concentration of the polymer must be below the critical entanglement concentration for the polymer molecules in solution, that is, each polymer molecule constitutes a discrete entity. Each such discrete polymer molecule may be referred to as an isolated domain. The lower the molecular weight of the polymer, the higher the critical entanglement concentration for the polymer, thus the greater the amount of polymer which can be used for a given volume of solvent.

As will be seen from the examples which follow, the iron precursor is preferably added in increments, so that a predetermined excess of dissolved, polymer-unbound iron precursor is present in solution. The mechanism and general sequence of events in the reaction mixture is somewhat as follows. When a relatively small increment of iron precursor is added to a solution of the passive polymer at an appropriate temperature, the passive polymer first serves as a reactant, and the iron precursor molecules become bound to the binding sites of the passive polymer. This reaction preceeds nucleation, wherein a particle nucleus is formed which may either be iron or some more complex iron-containing species. Thus, at the outset of the entire sequence of events, the passive polymer is a catalyst for the generation of iron particle nuclei or iron-containing particle nuclei, which are bound to the reactive sites of the polymer. At this point, the polymer has served its catalytic role for the nucleation of particles, and the reaction vessel contains randomly dispersed colloidal nuclei of iron or iron-containing particles bound to the reactive sites of the polymer. At nucleation, the decomposition becomes dominated by a new process, viz., disproportionation of iron precursor at the surfaces of the nuclei. The polymer stabilizes the nascent (growing) particles in the same domains in which the particles were nucleated, that is, collisional growth of the nascent particles is minimized. The principle role of the polymer now becomes stabilization of the newly formed colloidal iron system. Now the reaction merely enlarges the particles as more iron precursor is added incrementally and reacts at the surface of the polymer-bound particles. There is a distinct transformation from the particle nucleation stage to the particle growth stage, evidenced by a dramatic change in the rate of evolution of carbon monoxide.

The number of polymer molecules, i.e., discrete polymer molecule domains, is directly proportional to the number of iron particles and inversely proportional to the iron particle size at any given volume of iron.

Suitable passive polymers must, of course, be soluble in the solvent selected, preferably at about ambient temperature or slightly above for convenience, but in any event, necessarily at the temperature at which the iron precursor binding and iron precursor decomposition occur to produce colloidal iron particles. There are a number of passive polymers which may be used in the method of the instant invention. Such would include polymers bearing groups which non-oxidatively substitute iron carbonyls. Typical passive polymers of this type are vinyl type polymers containing alkenyl, phosphine, arsine, isonitrile and isocyanate groups. Typical examples of such passive polymers are copolymers of (1) styrene, ethylene, or derivatives thereof, with (2) butadiene, isoprene, cyclopentadiene, para-styryldiphenylphosphine and isopropenylisocyanate.

Turning now to a consideration of suitable iron precursors, such are labile iron carbonyl and iron organocarbonyl compounds. In referring to such compounds, the term "labile" as used herein is intended to signify that the iron in the compound is attached to a group which will readily become dissociated from the molecule to leave elemental iron. An important feature of the labile iron precursor is the mixture of its labile ligands. It is highly preferred that the ligands be volatile or otherwise easily removable from the reaction mixture. It is essential that the ligands do not interfere with or adversely affect the decomposition process and the stability of the resultant dispersion. Specific classes of such compounds include iron carbonyls, iron alkylcarbonyls, iron alkenylcarbonyls and iron nitrosyls. One specific class of such suitable iron precursors are iron carbonyls such as iron pentacarbonyl, diiron nonacarbonyl and triiron dodecacarbonyl. Iron pentacarbonyl is one especially preferred material, for reasons of low cost and ready availability. The other two iron carbonyls mentioned are also preferred materials, being readily prepared from iron pentacarbonyl and being commonly commercially available. A second class of suitable iron precursors, as mentioned, are iron alkylcarbonyls such as the alkyltetracarbonyl iron compounds, for example, methyltetracarbonyl iron, which may be prepared by methods disclosed in the literature. A third class, as mentioned, are iron alkenylcarbonyls, of which there are a large number, all of them being commercially available or readily prepared by conventional methods taught in the literature. A list of some specific useful iron alkenylcarbonyls includes: $(Butadiene)Fe(CO)_3$;

(1,1'-Bicyclohexenyl)Fe(CO)₃; (Cycloheptatriene)Fe(CO)₃; (Cyclooctatetraene)Fe(CO)₃; (Cyclopentadienyl)Fe(CO)₃; ([2,2,1]-Bicycloheptadiene)Fe(CO)₃; (Hexatriene)₂Fe(CO)₃; (Allyl)FeCl(CO)₃; (Hexatriene)Fe₂(CO)₆; (Cyclooctatetraene)Fe₂(CO)₆; and Bis(cyclopentadienyl)Fe₂(CO)₄. A fourth class of suitable iron precursors, as mentioned, are iron nitrosyls such as dinitrosylcarbonyl iron, Fe(NO)₂(CO)₂.

If the selected iron precursor is a liquid, it can be added directly to the reaction mixture in the appropriate increments, as shown in many of the examples which follow. On the other hand, if the iron precursor is a solid, it may first be dissolved in a small amount of a suitable solvent for incremental addition, or it may be added as a powder with, for example, a powder dosing funnel.

As has been mentioned, and as will be seen from the examples, the iron precursor should be added incrementally at suitable time intervals. As already indicated, the reason for this incremental addition is that two separate reactions can occur simultaneously. First, if too much iron precursor is added, some of it remains in solution, where it can decompose slowly to metallic iron. Decomposition of the unbound iron precursor is undesirable and should be minimized. Second, the preferred reaction is the decomposition of the polymer-bound iron species, and the incremental addition and the rate thereof should be adapted to favor this reaction.

As a minimum first increment of iron precursor, an amount of precursor may initially be added which is just enough to saturate all of the reactive binding sites on the passive polymer. However, it is preferred to add an excess of precursor up to about 5 to about 10 moles of iron precursor per mole of reactive sites, this preference existing because the excess unbound iron precursor does not decompose to metallic iron very readily compared to the polymer-bound iron precursor, and the excess is desirable to be readily available to react at the sites at which decomposition reaction has occurred, to facilitate nucleation and particle growth.

The subsequent increments are added based upon monitoring the evolution of carbon monoxide which occurs as a result of the decomposition of the iron precursor. When little carbon monoxide is being generated from the reaction mixture, it is apparent that the iron precursor present in the reaction mixture has substantially decomposed. Thus, it is desirable to wait until only a little or no carbon monoxide is being generated, then add another increment of up to about 5 to about 10 moles excess, and so on, until the addition of the final increment. Typically, it has been found that it is desirable to wait for a period of about 2 to about 4 hours between increments, depending upon the reaction rate, which is a function of the reagents, solvent, temperature and other conditions.

After the last increment has been added it is generally convenient to continue heating, for example, for about 24 hours to evolve the last traces of carbon monoxide, indicating substantially total completion of the desired reaction. Of course, it is possible to add increments less frequently than indicated above. On a production basis, it would be preferred to add the iron precursor continuously at a rate determined to be sufficient to compensate for the consumption of the iron precursor in the reaction vessel, which is basically a continuous incremental addition.

The maximum amount of iron precursor which can effectively be added to the dispersion is determined experimentally by the point at which the total iron concentration in the dispersion can no longer be increased significantly. Immediately following particle nucleation, the particle size is at a minimum in any given system. One can discontinue adding additional iron precursor when the desired particle size has been achieved. If the aforementioned maximum amount of iron precursor is exceeded, undesirable results such as a wider particle size ranges and precipitation of the colloidal dispersion ensue.

Turning now to a consideration of solvents which are suitable for preparing the colloidal iron dispersions of the instant invention, suitable solvents must be insert in the sense that they do not react with the iron precursor, nor with the passive polymer, and, of course, not with the resulting iron dispersion. The solvent must be capable of dissolving the passive polymer, preferably at about ambient temperature or slightly above for convenience, and necessarily at the reaction temperature. It should likewise be a good solvent for the iron precursor, preferably at about ambient temperature, and necessarily at the reaction temperature. Thus, practically speaking, the choice of a suitable solvent depends upon the iron precursor employed and the polymer employed, with due regard to the solubility and reactivity of these materials. A wide variety of inert solvents may be employed. Some solvents which have been found to be particularly useful include the following: (1) benzene and alkyl derivatives thereof such as monoalkylbenzenes and dialkylbenzenes; (2) halogenated derivatives of benzene such as chlorobenzene, o-dichlorobenzene, and p-dichlorobenzene; (3) straight chain and cyclic hydrocarbons, and particularly alkanes having from about 5 to about 20 carbon atoms, either straight chain or branched, such as decane, octane, hexadecane, pentane, iso-octane and neopentane, and cyclic alkanes such as cyclohexane, decalin and tetrailn; (4) ethers and alcohols such as tetrahydrofuran, dialkyl ethers, ethyleneglycolmonomethylether, ethyleneglycolmonoethylether, butanol, hexanol and cyclohexanol; (5) esters such as alkylacetates, alkylpropionates and alkylbutyrates; and (6) ketones such as cyclohexanone, mesityl oxide, etc..

There is no particular upper limit on the boiling point of the solvent selected, but there is a practical lower limit, that being the temperature at which thermal decomposition of the polymer-bound iron precursor will proceed at the pressure employed. Concerning the melting point of the solvent, it must be a liquid at the reaction temperature of the thermal decomposition of the polymer-bound iron precursor, and it should preferably be liquid at ambient temperature or slightly above ambient temperature to facilitate making the reaction mixture and subsequent processing of the resulting dispersion after the reaction is complete.

The amount of solvent to be employed depends primarily upon the passive polymer which is selected, and more particularly, upon the molecular weight thereof, bearing in mind that the concentration of the passive polymer in the solvent solution must be below the critical entanglement concentration for the polymer molecules, so that each polymer molecule is a discrete, individual, isolated domain, not entangled with any other polymer molecules. As a practical matter, the lowest molecular weight polymer which would ordinarily be used would have a molecular weight of about 1,000, so as to be capable of forming sizable discrete domains. With such a low molecular weight polymer, it is possible to use about 10 percent or more by weight of polymer based upon the weight of the solvent, based upon the critical entanglement concentration. Of course, one may use more solvent than the required minimum, if desired. As a practical matter, the maximum molecular weight of the polymer which may ordinarily be used is about 1 million, and with such a high molecular weight polymer, a maximum polymer concentration of about 0.5 percent by weight based upon the weight of the solvent may be used; typically, with such high molecular weight polymers, the polymer concentration which is generally preferred may range from about 0.2 percent to about 0.5 percent by weight based upon the weight of the solvent, again, the limit being based upon the critical entanglement concentration. The molecular weight of the passive polymer which is selected is chosen primarily with regard to the size of the colloidal iron particles desired; the higher concentrations of lower molecular weight range polymers will produce relatively small particles, whereas lower concentrations of higher molecular weight polymers will tend to yield larger colloidal particles. Typically, the molecular weight of the passive polymers ranges from about 10,000 to about 100,000, in which case the typical concentration of the passive polymer in the solvent ranges, respectively, from about 5 percent down to about 2 percent by weight based upon the weight of the solvent.

Concerning the reaction temperature, the solution of passive polymer and iron precursor is heated at a temperature at which the polymer-bound iron precursor decomposes to iron at a much more rapid rate than any unbound free iron precursor which may be in the solution decomposes to iron. In practice, a suitable temperature range is from about 100° C. to about 170° C. for most systems, and the preferred temperature range for most systems is from about 130° C. to about 150° C. The optimal temperature for any given system may readily be determined simply by monitoring the rate of carbon monoxide evolution from the system. Excessive temperatures may result in an uncontrolled reaction and undesirable precipitation of iron particles of the order of a micron. Prior to nucleation, the rate of carbon monoxide evolution in the presence of the passive polymer is comparable to that in the absence of polymer. However, after nucleation, the rate of decomposition at the surface of the particles is much faster than that in solution. It is generally preferable to use the minimum temperature that will give a significant rate of decomposition of the polymer-bound iron precursor to iron, since this also tends to minimize solution phase decomposition. The optimum temperature varies with the system and, as mentioned, is best simply determined experimentally. It is generally preferred to conduct the reaction at atmospheric pressure for convenience, although the reaction will proceed at a pressure above or below atmospheric pressure, which would, in turn, influence the boiling point of the selected solvent. The solvent, of course, must have a boiling point which is at least as high as the desired reaction temperature at the pressure employed. It is useful to select a solvent having a boiling point, at the pressure employed, such that the reaction may be carried out at reflux temperature, this being useful in that it assists the evolution of carbon monoxide. However, it is possible to operate at temperatures below reflux temperature.

As mentioned, the reaction should be carried out in an inert atmosphere, that is, inert in the sense that the atmosphere does not cause any adverse reactions in the system, either with respect to the solvent, the polymer, the iron precursor or the product. While argon is conveniently used in the examples which follow, other inert atmospheres may be employed such as nitrogen, neon and helium, or the reaction may be carrier out in a vacuum with sufficiently high boiling solvents and iron precursors.

It is to be particularly noted that the polymer is both a reactant and a catalyst for the decomposition of the iron precursor; it is not an inactive component which merely serves to stabilize independently nucleated particles.

The following examples are intended to illustrate, and not to limit, the scope of the instant invention.

EXAMPLE I

This example illustrates the preparation of a colloidal dispersion of iron particles prepared with a hydroxyl-terminated copoly(styrene/butadiene) (0.25/0.75)molar as the passive polymer.

20.0 g of the aforementioned passive polymer is dissolved in 500 g. of xylene at ambient temperature (about 25° C.) in a 1 liter 4-neck round bottom flask. This represents a 3.85 weight percent polymer solution. The flask is equipped with a paddle stirrer, a thermometer long enough to have its bulb immersed in the liquid, a reflux condenser, and a combined gas inlet and rubber serum cap for introducing an inert atmosphere and reactants and to permit sampling the reaction mixture with a hypodermic syringe and needle. The reflux condenser is vented to the atmosphere through a drying tube containing a dessicant. The lower portion of the flask is immersed in a mineral oil bath as a heat source.

In preparation for the introduction of the iron precursor, iron pentacarbonyl, the solution in the flask is heated to 135° C. and the system is throroughly purged with argon overnight for about 16 hours with the temperature being maintained at 135° C. 142.7 g. of iron pentacarbonyl is added in twenty 7.15 g. increments, generally maintaining a continuing argon flow and constant stirring. The increments are added every 2.5 hours. The progress of the reaction and the formation of polymer liganded metal carbonyl intermediates is followed by taking periodic infrared spectra of samples removed from the reaction mixture. After adding the last increment, heating is continued for about 24 hours until the iron pentacarbonyl has been completely decomposed, as conveniently determined by the absence of iron-carbonyl bands near 2,000 $cm^{-1}$ in the infrared spectrum of the dispersion. The dispersion is cooled to room temperature, and, under an inert atmosphere of argon, the dispersion is filtered to remove any large particles of iron or precipitated polymer, that is, anything flocculent. The filtration is carried out under pressure through a pad filter having pores of 2-4 microns and the filtrate is then bottled under argon in serum bottles for retention and further testing. The resultant dispersion is strongly superparamagnetic, having a magnetization of 130 emu/g. of iron at 10 KiloOersteds (KOe). The dispersion contains 7.0% iron by weight and 5.0% polymer by weight, the iron particles being bound to the polymer molecules. The dispersion is comprised of iron particles ranging from about 60-90 Angstrom units in diameter.

The magnetization is measured in order to assess the degree to which oxygen has been successfully excluded from the reaction system. Dispersions which show no oxide lines in their electron diffraction patterns typically exhibit magnetization values of about 120 to about 170 emu/g. of iron at 10 KOe. Extensive oxidation will lower the magnetization. Relatively high magnetization values are particularly useful in the preparation of magnetic xerographic developer materials.

The instant invention provides a method for the preparation of a homogeneous, physically stable colloidal elemental iron dispersion, suitable for use as a catalyst, comprising colloidal iron particles having a particle size within the range of from about 10 Angstrom units to about 200 Angstrom units dispersed in an inert liquid and stabilized by the presence of a passive polymer to the reactive sites of which the iron particles are bound.

EXAMPLE II

This example illustrates the preparation of a colloidal dispersion of iron particles using decahydronaphthalene as the solvent.

Example I is repeated, the only significant difference being that 500 g. of decahydronaphthalene is substituted for the 500 g. of xylene. The resulting dispersion contains 4.0 weight percent iron and 6.0 weight percent polymer. The dispersion is strongly superparamagnetic, exhibiting a magnetization of 120 emu/g. of iron at 10 KOe. The particle size of the colloidal iron in the dispersion ranges from about 60–90 Angstrom units in diameter.

EXAMPLE III

This example illustrates the preparation of a colloidal dispersion of iron particles using a hydroxyl-terminated poly(butadiene) as the passive polymer.

Example II is repeated, the only significant difference being that 20.0 g. of a hydroxyl-terminated poly(butadiene) is substituted for the 20.0 g. of the passive polymer employed in Example II.

The resultant iron dispersion is strongly superparamagnetic, exhibiting a magnetization of 170 emu/g. of iron at 10 KOe. The dispersion contains 3.9 percent of iron by weight and 8.9 percent polymer by weight, the iron particles being bound to the polymer molecules, the dispersion comprising particles ranging from about 60–90 Angstrom units in diameter.

EXAMPLE IV

This example illustrates the preparation of a colloidal dispersion of iron particles using copoly(styrene/para-styryldiphenylphosphine) (9.3/0.7)molar as the passive polymer.

Example I is repeated, the only significant differences being that (1) 3.73 g. of the above-mentioned passive polymer is substituted for the 20.0 g. of the passive polymer employed in Example I; (2) only 250 g. of xylene is used as the inert solvent; and (3) only 17.35 g. of iron pentacarbonyl is added in 12 equal increments. The resulting dispersion is strongly superparamagnetic, and contains 2.75 percent iron by weight and 1.13 percent polymer by weight, the iron particles being bound to the polymer molecules. The dispersion comprises iron particles ranging from about 30–60 Angstrom units.

EXAMPLE V

This example illustrates the use of a colloidal iron dispersion according to the invention as a catalyst.

A colloidal iron dispersion prepared as in Example IV is used to catalyze the hydroformylation of 1-hexene as follows. While constantly maintaining an inert atmosphere of argon, 100 g. of the dispersion is diluted to 500 ml. with xylene in a one liter capacity autoclave, and 86 g. of 1-hexene is added. The autoclave is closed and the argon is removed and replaced with a mixture of equal parts by volume of carbon monoxide and hydrogen. The temperature of the mixture is raised to 100° C., then the pressure in the autoclave is increased to 42 atmospheres with a 1:1 volume mixture of carbon monoxide and hydrogen, and the temperature and pressure are maintained for 4 hours. The pressure is then released and the reaction mixture is blanketed with an atmosphere of argon, then cooled to ambient temperature. A sample of the product of the reaction is removed and subjected to gas chromatographic analysis, which shows that 85 percent of the 1-hexene is converted to normal and iso heptaldehydes. The ratio of normal heptaldehyde to iso heptaldehyde is about 1.5:1 by weight.

EXAMPLE VI

This example illustrates the preparation and use of a supported colloidal iron particle catalyst according to the invention by means of suspension polymerization.

100 g. of colloidal iron dispersion prepared substantially as in Example IV is vacuum concentrated at 70° C. to 50 percent by weight of nonvolatile material. To the concentrate is added 150 g. of styrene monomer and 2 g. of divinylbenzene monomer, resulting in a dispersion of the colloidal iron particles in the solution of the two monomers. 1.5 g. of stearic acid as a lubricant and 1.5 g. of azobisisobutyronitrile as a polymerization initiator in solution are dissolved in the dispersion.

A 2-liter round bottom flask equipped with a stirrer, reflux condenser and argon inlet is provided, with an oil bath as a heat source. Into the flask is introduced 500 ml. of deionized water, 0.1 g. of sodium lauryl sulfate as a surfactant, 1.5 g. of sodium polyacrylate as a dispersant and protective colloid, and 5 g. of sodium sulfate. After heating the contents of the flask to 80° C., the colloidal iron dispersion containing the monomers is added and the mixture is stirred vigorously at 80° C. for 4 hours under a constant argon atmosphere. During the 4 hour period, the styrene and divinylbenzene are polymerized to yield beads of cross-linked polystyrene of the order of 1 mm. in diameter containing 1.83 weight percent iron particles having a diameter of about 30–60 Angstrom units. The reaction mixture is cooled to room temperature, filtered, and the product catalyst beads are vacuum dried at 60° C. to yield about 140 g. of the supported catalyst.

The catalyst prepared as above is used to catalyze the hydroformylation of 1-hexene as follows. While constantly maintaining an inert atmosphere of argon, 150 g. of catalytic beads is slurried in 500 ml. of cyclohexane in a one liter capacity autoclave, and 86 g. of 1-hexene is added. The autoclave is closed and the argon is removed and replaced with a mixture of equal parts by volume of carbon monoxide and hydrogen. The temperature of the mixture is raised to 100° C., then the pressure in the autoclave is increased to 42 atmospheres with a 1:1 volume mixture of carbon monoxide and hydrogen, and the temperature and pressure are maintained for 4 hours. The pressure is then released and the reaction mixture is blanketed with an atmosphere of argon, then cooled to ambient temperature. A sample of the product of the reaction is removed and subjected to gas chromatographic analysis, which shows that 85 percent of the 1-hexene is converted to normal and iso heptaldehydes. The ratio of normal heptaldehyde to iso heptaldehyde is about 1.5:1 by weight.

As illustrated by Example VI, the invention provides a method for the preparation of a bead-supported catalyst comprising colloidal iron particles having a particle size within the range of from about 10 Angstrom units to about 200 Angstrom units, said particles being bound to the reactive sites of a passive polymer, and said particles and passive polymer being supported in the beads, said method comprising supporting a liquid-dispersed colloidal elemental iron catalyst in beads, said beads being produced by suspension polymerization of at least one polymerizable monomer.

EXAMPLE VII

This example illustrates the preparation of colloidal iron particle dispersions using a passive radial block copolymer of styrene and butadiene having a molar ratio of 0.4:0.6 of styrene to butadiene.

Example I is repeated, the only significant differences being that (1) 5.0 g. of the aforementioned passive radial block copolymer is substituted for the 20.0 g. of the passive polymer employed in Example I; (2) only 250 g. of xylene is used as the inert solvent, representing a 2.0 weight percent polymer solution; and (3) only 64.22 g. of iron pentacarbonyl is added in 18 equal increments. The resultant colloidal iron dispersion comprises 6.4 weight percent iron and 1.5 weight percent polymer, the iron particles having a size of about 100 Angstrom units. Some of the particles of this dispersion are aggretated in clusters up to about 300 Angstrom units in diameter.

Depending upon the amounts of polymer and iron precursor employed, colloidal iron dispersions according to the invention, with the iron particles bound to the polymer molecules, may be prepared having a weight ratio of iron to polymer within the range of from about 10:100 to about 90:10.

EXAMPLE VIII

This example illustrates the use of a passive linear A-B block copolymer of styrene and butadiene having a molar ratio of 0.4:0.6 of styrene to butadiene.

Example VII is repeated, the only significant differences being that (1) 5.0 g. of the aforementioned passive linear block copolymer is substituted for the passive radial block copolymer in Example VII; and (2) 72.0 g. of iron pentacarbonyl is added as the iron precursor in twenty equal increments. The resultant product is a colloidal dispersion of iron particles having a particle size range of about 50–100 Angstrom units. The dispersion contains 7.0 weight percent iron and 1.5 weight percent polymer. The dispersion is strongly superparamagnetic, having a magnetization of 140 emu/g. of iron at 10 KOe.

EXAMPLE IX

This example illustrates the use of an emulsion polymerized copoly(styrene/butadiene)(23.5/76.5)molar as the passive polymer.

Example VII is repeated, the only significant difference being that 5.0 g. of the aforementioned emulsion polymerized passive polymer is substituted for the radial block copolymer. The resulting stable colloidal iron dispersion contains colloidal iron particles having a size range of about 50–100 Angstrom units. It contains 6.5 weight percent iron and 1.5 weight percent polymer. The dispersion is strongly superparamagnetic, having a magnetization of 130 emu/g. of iron at 10 KOe.

EXAMPLE X

This example illustrates the use of a passive copolymer containing isocyanate residues as the reactive binding sites.

First, in order to make the desired passive copolymer, a 250 ml. four neck round bottom flask is equipped with a 250 ml. addition funnel, a paddle stirrer, a thermometer, a reflux condenser and an inert argon gas inlet tube. Into the addition funnel are introduced 85 g. of styrene monomer; 15 g. of 1,1-dimethyl-1-(2-hydroxypropyl)amine methacrylamide monomer; 1.4 g. of azobisisobutyronitrile as a polymerization initiator; and 34.0 g. of 2-butanol solvent. Into the flask is introduced 66 g. of xylene, and the interior of the flask is purged with argon for an hour at ambient temperature. Half of the contents of the addition funnel are added to the flask and the reaction mixture is heated to 90° C. by immersion in a heated oil bath, maintaining constant stirring and an argon atmosphere. When the temperature reaches 90° C., the second half of the contents of the additional funnel are added to the polymerizing mixture in the flask gradually, over a period of about one hour. The temperature is maintained at 90° C. for about four hours, then increased to 105° C. where it is held for an additional four hours, all of the foregoing being carried out with constant stirring and maintaining an argon atmosphere. The solution is then cooled to room temperature. The solution contains 50 weight percent of a copolymer of styrene and 1,1-dimethyl-1-(2-hydroxypropyl)amine methacrylamide. Ten grams of the copolymer solution is dissolved in 500 g. of xylene, and photolysis is carried out with a high pressure ultraviolet lamp to produce the desired starting copolymer containing isocyanate residues. This solution is used directly in the synthesis of a stable colloidal iron dispersion substantially as set forth in Example I, except that only 72 g. of iron pentacarbonyl is added as the iron precursor in twenty equal increments. The resulting stable colloidal iron suspension contains colloidal iron particles having a size range of about 50–100 Angstrom units, and contains 6.0 weight percent iron and 1.3 weight percent polymer. The dispersion is strongly superparamagnetic having a magnetization of 120 emu/g. of iron at 10 KOe.

EXAMPLE XI

This example illustrates the use of actinic radiation to effect the binding of the iron precursor to the passive polymer, preliminary to the thermal decomposition of the bound iron precursor to elemental iron.

20 g. of the same passive polymer used in Example I is dissolved in 500 g. of xylene, and the atmosphere is purged with argon, the argon atmosphere being thereafter maintained. 5 ml. of iron pentacarbonyl is added to the polymer solution. The mixture if photolyzed for 10 minutes with a high pressure ultraviolet lamp. The infrared spectrum of the resulting solution shows the presence of butadienylirontricarbonyl residues on the polymer. This resulting solution is then charged under an argon atmosphere to a reaction vessel as described in Example I, and 140 g. of iron pentacarbonyl is added in nineteen equal increments under essentially the same conditions as in Example I. After adding the last increment, heating is continued for about 24 hours until the iron pentacarbonyl has been completely decomposed.

The resulting dispersion is cooled to room temperature, and, under an inert atmosphere of argon, the dispersion is filtered to remove any large particles of anything flocculent. The filtration is carried out under pressure through a pad filter having pores of 2-4 microns and the filtrate is then bottled under argon in serum bottles for retention and further testing. The resultant dispersion is strongly superparamagnetic, having a magnetization of 130 emu/g. of iron at 10 KOe. The dispersion contains 7.0 percent by weight of iron and 4.0 percent polymer by weight. The dispersion comprises iron particles ranging from about 70-120 Angstrom units in diameter.

Although the invention has been described herein with reference to various preferred embodiments, it is to be understood that variations and modifications may be resorted to as will be apparent to those skilled in the art. Such variations and modifications are to be considered within the purview and the scope of the claims appended hereto.

For example, it is usual to add the polymer to the solvent and dissolve it as the first step, at room temperature, or at some higher temperature which may be as high as the temperature at which the reaction is to occur. However, this procedure could be varied, for example, by adding the first increment of the iron precursor to the solvent first, and then dissolving the polymer in the solvent, subsequently heating to the reaction temperature. It is also possible, during the reaction, to add more polymer to provide additional reactive sites to increase the number of iron particles in the system. Also, additional polymer, over and above the earlier-mentioned approximately 10 percent or more maximum, may be added at the end of the reaction to enhance the stability of the dispersion, depending upon the intended purpose for the dispersion. It may be preferred to use two different polymers, one being inert and the other being reactive; the inert polymer would typically, but not necessarily, be added after nucleation, and serves to enhance the stability of the resulting dispersion. One may, of course, use a plurality of iron precursors, suitably adjusting the conditions. If it is planned to conduct a continued series of reactions using the same materials, it is possible to make a master nucleated batch of polymer-bound iron precursor for subsequent use as desired.

As another possible variation, the decomposition of the polymer-bound iron precursor, while preferably and most conveniently effected by heat, may also be effected by other stimuli such as actinic radiation. Also, actinic radiation may be used to effect loss of one or more ligands from the iron precursor, at ambient temperature or below, thus enabling the binding of the iron precursor to the reaction sites, as illustrated in Example XI.

Referring to the examples, most of the passive polymers used are copolymers, but while this is preferable, it is not essential. Any suitable homopolymer containing reactive sites may be used. Preferably, however, it is desirable to copolymerize the monomer containing the binding moiety with an inert monomer, so that the inert moieties in the polymer chain reduce the number of binding sites in the entire chain, the polymer thus containing moieties having some reactive sites and also moieties not containing reactive sites. Desirably, the inert monomer is selected from the group consisting of styrene, ethylene, methylmethacrylate and vinylacetate and the comonomer containing the binding moiety is selected from the group consisting of butadiene, isoprene, cyclopentadiene, para-styrldiphenylphosphine and isopropenylisocyanate.

The colloidal iron dispersions, if stored, should be stored under an inert atmosphere to prevent oxidation of the iron particles and/or other undesirable reactions.

What is claimed is:

1. A method for the preparation of a homogeneous, physically stable colloidal elemental iron dispersion comprising:
   (a) preparing a solution in an inert solvent of a passive polymer, the concentration of the polymer being below its critical entanglement concentration, to provide discrete reactive binding sites to which iron precursor molecules can become bound upon loss of at least one ligand from the iron precursor;
   (b) incrementally adding, at suitable time intervals, an iron precursor, the molecules of which lose at least one ligand and rapidly become bound to the reactive sites of the polymer;
   (c) maintaining a temperature which is sufficiently high to decompose the polymer-bound iron precursor much more rapidly than any iron precursor which may remain unbound in the solution decomposes to iron;
   (d) continuing the addition of increments of iron precursor to yield colloidal iron particles of the desired size within the range of from about 10 Angstrom units to about 200 Angstrom units, the iron particles being bound to the polymer molecules; and
   (e) steps (b), (c) and (d) being carried out in an inert atmosphere.

2. A method as set forth in claim 1 wherein the final increment, after decomposition, yields colloidal iron particles having a maximum size of about 150 Angstrom units.

3. A method as set forth in claim 1 wherein the final increment, after decomposition, yields colloidal iron particles, some of which have a maximum size of about 120 Angstrom units, the resulting dispersion being superparamagnetic.

4. A method as set forth in claim 1 wherein the iron precursor increments are added in an amount of from about 5 to about 10 moles of iron precursor per mole of reactive binding sites.

5. A method as set forth in claim 1 wherein the iron precursor increments are added when only a little or no carbon monoxide is being generated.

6. A method as set forth in claim 1 wherein the iron precursor increments are added from about 2 to about 4 hours apart.

7. A method as set forth in claim 1 which is carried out at about atmospheric pressure.

8. A method as set forth in claim 1 wherein the addition of increments of the iron precursor is continuous, at a rate sufficient to compensate for the consumption of the iron precursor already added.

9. A method as set forth in claim 1 wherein the sufficiently high temperature is reflux temperature.

10. A method as set forth in claim 1 wherein the sufficiently high temperature is within the range of from about 100° C. to about 170° C.

11. A method as set forth in claim 10 wherein the temperature is within the range of from about 130° C. to about 150° C.

12. A method as set forth in claim 1 wherein the sufficiently high temperature is the minimum temperature that will cause a significant rate of decomposition of the polymer-bound iron precursor.

13. A method as set forth in claim 1 wherein decomposition of the polymer-bound iron precursor to iron is effected by actinic radiation instead of heat.

14. A method as set forth in claim 1 wherein the binding of the iron precursor to the passive polymer is effected by actinic radiation.

15. A method as set forth in claim 1 wherein additional polymer is added during the reaction.

16. A method as set forth in claim 1 wherein additional polymer is added after the reaction is complete.

17. A method as set forth in claim 1 wherein the passive polymer is soluble in the inert solvent at about ambient temperature.

18. A method as set forth in claim 1 wherein the passive polymer is a homopolymer.

19. A method as set forth in claim 1 wherein the passive polymer is a copolymer of a reactive monomer and an inert monomer.

20. A method as set forth in claim 19 wherein said copolymer is prepared by polymerization of vinyl type monomers.

21. A method as set forth in claim 19 wherein the inert monomer is selected from the group consisting of styrene, ethylene, methylmethacrylate and vinylacetate and the reactive monomer is selected from the group consisting of butadiene, isoprene, cyclopentadiene, para-styryldiphenylphosphine and isopropenylisocyanate.

22. A method as set forth in claim 1 wherein said passive polymer has a molecular weight of from about 1000 to about 1 million.

23. A method as set forth in claim 22 wherein the passive polymer concentration in the solution is, respectively, from about 10 percent or more to about 0.2–0.5 percent by weight based upon the weight of the solvent.

24. A method as set forth in claim 1 wherein said passive polymer has a molecular weight of from about 10,000 to about 100,000.

25. A method as set forth in claim 24 wherein the passive polymer concentration in the solution is, respectively, from about 5 percent to about 2 percent by weight based upon the weight of the solvent.

26. A method as set forth in claim 1 wherein said inert solvent is a liquid at about ambient temperature.

27. A method as set forth in claim 1 wherein said iron precursor is an iron carbonyl.

28. A method as set forth in claim 27 wherein said iron carbonyl is iron pentacarbonyl.

29. A method as set forth in claim 27 wherein said iron carbonyl is diiron nonacarbonyl.

30. A method as set forth in claim 27 wherein said iron carbonyl is triiron dodecacarbonyl.

31. A method as set forth in claim 1 wherein said iron precursor is an iron alkylcarbonyl.

32. A method as set forth in claim 1 wherein said iron precursor is an iron alkenylcarbonyl.

33. A method as set forth in claim 1 wherein said iron precursor is an iron nitrosyl.

34. A homogeneous, physically stable colloidal elemental iron dispersion, suitable for use as a catalyst, comprising colloidal iron particles having a particle size within the range of from about 10 Angstrom units to about 200 Angstrom units dispersed in an inert liquid and stabilized by the presence of a passive polymer to the reactive sites of which the iron particles are bound, said dispersion being prepared by the method of claim 1.

35. A dispersion as set forth in claim 34 having a maximum colloidal iron particle size of about 150 Angstrom units.

36. A dispersion as set forth in claim 34 having a maximum colloidal iron particle size of about 120 Angstrom units and being superparamagnetic.

37. A dispersion as set forth in claim 34 wherein the weight ratio of iron to polymer is within the range of from about 90:100 to about 90:10.

38. A method for the preparation of a bead-supported catalyst comprising colloidal iron particles having a particle size within the range of from about 10 Angstrom units to about 200 Angstrom units, said particles being bound to the reactive sites of a passive polymer, and said particles and polymer being supported in the beads, said method comprising supporting a liquid-dispersed colloidal elemental iron catalyst as set forth in claim 34 in beads, said beads being produced by suspension polymerization of at least one polymerizable monomer.

39. A bead-supported catalyst as set forth in claim 38 wherein the beads comprise cross-linked polystyrene.

* * * * *